(12) United States Patent
Kim et al.

(10) Patent No.: US 10,713,948 B1
(45) Date of Patent: Jul. 14, 2020

(54) METHOD AND DEVICE FOR ALERTING ABNORMAL DRIVER SITUATION DETECTED BY USING HUMANS' STATUS RECOGNITION VIA V2V CONNECTION

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/738,484

(22) Filed: Jan. 9, 2020

Related U.S. Application Data

(60) Provisional application No. 62/799,181, filed on Jan. 31, 2019.

(51) Int. Cl.
*G08G 1/16* (2006.01)
*G06K 9/00* (2006.01)
*G06K 9/62* (2006.01)

(52) U.S. Cl.
CPC ......... *G08G 1/163* (2013.01); *G06K 9/00248* (2013.01); *G06K 9/00335* (2013.01);
(Continued)

(58) Field of Classification Search
CPC .............. G08G 1/163; G06K 9/00248; G06K 9/00335; G06K 9/00845; G06K 9/6232; G06K 9/6256
See application file for complete search history.

(56) References Cited

U.S. PATENT DOCUMENTS

| 10,127,813 | B2 * | 11/2018 | Walsh | G08G 1/0965 |
| 2002/0101354 | A1 * | 8/2002 | Banas | G08B 21/06 340/576 |

(Continued)

*Primary Examiner* — Utpal D Shah
(74) *Attorney, Agent, or Firm* — Husch Blackwell LLP

(57) ABSTRACT

A method for warning by detecting an abnormal state of a driver of a vehicle based on deep learning is provided. The method includes steps of: a driver state detecting device (a) inputting an interior image of the vehicle into a drowsiness detecting network, to detect a facial part of the driver, detect an eye part from the facial part, detect a blinking state of an eye to determine a drowsiness state, and inputting the interior image into a pose matching network, to detect body keypoints of the driver, determine whether the body keypoints match one of preset driving postures, to determine the abnormal state; and (b) if the driver is in a hazardous state referring to part of the drowsiness state and the abnormal state, transmitting information on the hazardous state to nearby vehicles over vehicle-to-vehicle communication to allow nearby drivers to perceive the hazardous state.

18 Claims, 6 Drawing Sheets

(52) U.S. Cl.
CPC ....... *G06K 9/00845* (2013.01); *G06K 9/6232* (2013.01); *G06K 9/6256* (2013.01)

(56) References Cited

U.S. PATENT DOCUMENTS

| | | | | |
|---|---|---|---|---|
| 2017/0308762 | A1* | 10/2017 | Kim | A61B 5/0077 |
| 2019/0018418 | A1* | 1/2019 | Tseng | G05D 1/0016 |
| 2019/0100219 | A1* | 4/2019 | Jo | B60W 40/08 |
| 2019/0213429 | A1* | 7/2019 | Sicconi | G06K 9/00845 |
| 2020/0042017 | A1* | 2/2020 | Kelkar | G08G 1/22 |

* cited by examiner

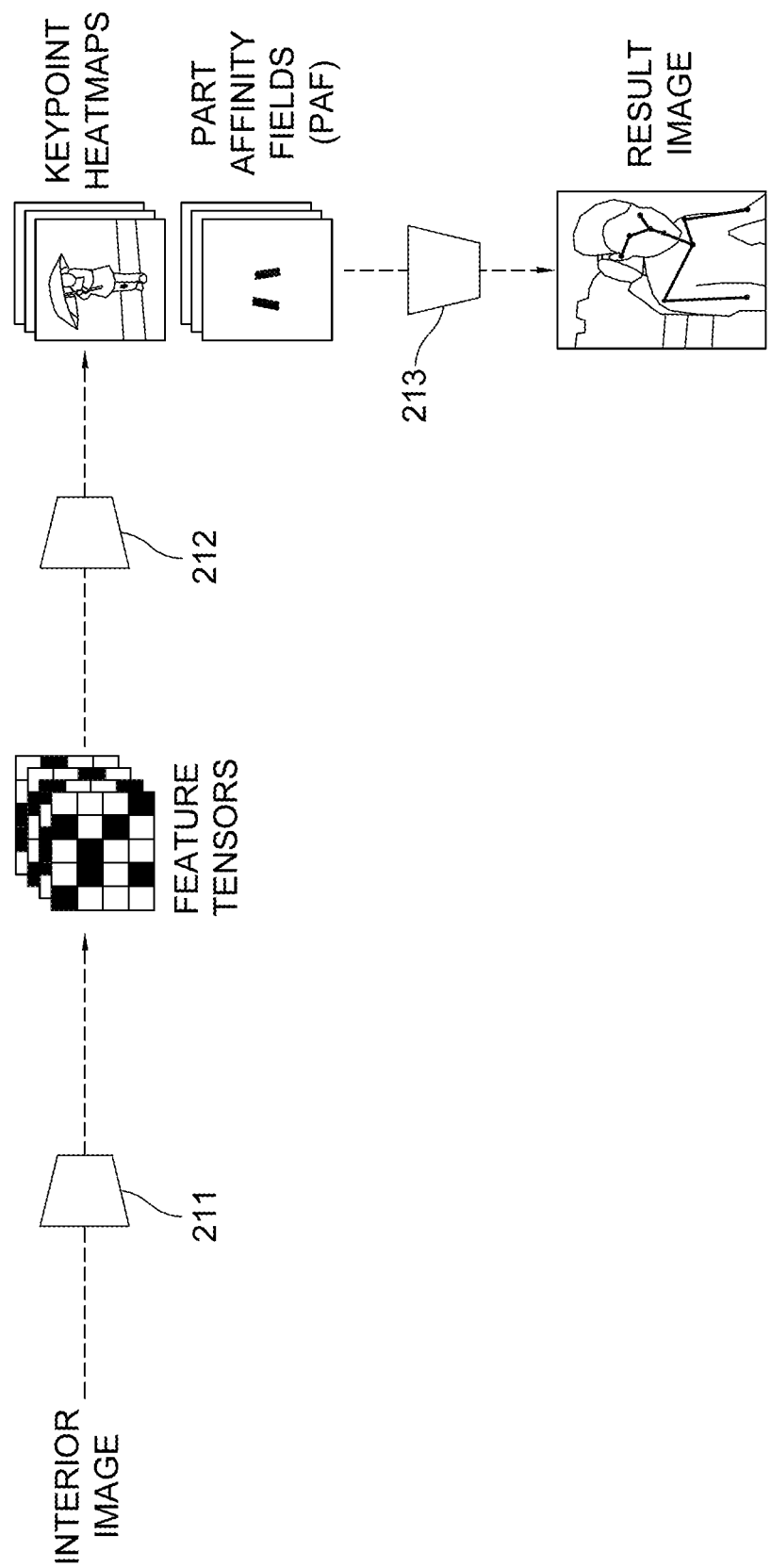

METHOD AND DEVICE FOR ALERTING ABNORMAL DRIVER SITUATION DETECTED BY USING HUMANS' STATUS RECOGNITION VIA V2V CONNECTION

CROSS REFERENCE TO RELATED APPLICATION

This application claims the benefit of priority to U.S. Provisional Patent Application No. 62/799,181, filed on Jan. 31, 2019, the entire contents of which being incorporated herein by reference.

FIELD OF THE DISCLOSURE

The present disclosure relates to a method and a device for detecting a drowsiness state and an abnormal state of a driver of a vehicle, to thereby give a warning of the drowsiness state and the abnormal state based on deep learning; and more particularly, to the method and the device for detecting the drowsiness state of the driver, based on a blinking state of an eye of the driver, from an interior image of the vehicle, and detecting the abnormal state of the driver by referring to a pose of the driver, to thereby give the warning.

BACKGROUND OF THE DISCLOSURE

Traffic accidents that cause the greatest damage occur during driving, and most of them are usually caused by drowsiness, DUI, and distraction.

As a method for preventing such traffic accidents in advance, a driver himself or herself had to be self-aware and careful, in the past. Recently, however, a driver state is monitored by using technology, and the driver is guided to safe driving by a warning, and a typical example thereof is a Driver-State Monitoring Device, hereinafter referred to as a DSM device.

The DSM device monitors the driver's face by projecting near infrared rays to the driver's face using a Near Infra-Red (NIR) camera and acquiring the driver's facial image accordingly. And an algorithm that assigns weights to factors closer to drowsiness by prioritizing the characteristics of blinking, such as the frequency of blinking, the number of times of blinking, is used to determine whether the driver is sleepy. In addition, a state of the distraction is determined by recognizing a facial direction and an ocular state, and the driver is warned in case the driver is determined as not looking at the front for a predetermined time.

However, in such conventional methods, there is a problem that the warning to the driver becomes meaningless when the driver is in a state of being unable to respond to the warning.

Further, in such conventional methods, when the driver's position is changed, there is a limit in detecting an abnormal state of the driver using the camera.

Accordingly, the inventors of the present disclosure propose a method to efficiently detect a hazardous state, such as a drowsiness state or an abnormal state, representing that the driver is asleep, etc. so as to prevent the traffic accidents in advance.

SUMMARY OF THE DISCLOSURE

It is an object of the present disclosure to solve all the aforementioned problems.

It is another object of the present disclosure to efficiently detect at least one abnormal state of a specific driver.

It is still another object of the present disclosure to warn nearby drivers, who are driving nearby vehicles, of the abnormal state of the specific driver.

It is still yet another object of the present disclosure to prevent traffic accidents that may occur due to the abnormal state of the specific driver.

In accordance with one aspect of the present disclosure, there is provided a method for giving a warning by detecting a drowsiness state and an abnormal state of a specific driver of a specific vehicle based on deep learning, including steps of: (a) if at least one interior image of an interior of the specific vehicle is acquired, a driver state detecting device performing at least part of (i) a process of inputting the interior image into a drowsiness detecting network, to thereby allow the drowsiness detecting network to detect at least one facial part of the specific driver from the interior image, detect at least one eye part of the specific driver from the facial part, detect a blinking state of at least one eye of the specific driver, and thus determine the drowsiness state of the specific driver, and (ii) a process of inputting the interior image into a pose matching network, to thereby allow the pose matching network to detect one or more body keypoints, corresponding to a body of the specific driver, from the interior image, determine whether the body keypoints match one of preset driving postures and thus determine the abnormal state of the specific driver; and (b) if the specific driver is determined as in a hazardous state by referring to at least part of the drowsiness state of the specific driver outputted from the drowsiness detecting network and the abnormal state of the specific driver outputted from the pose matching network, the driver state detecting device performing a process of transmitting information on the hazardous state of the specific driver to one or more nearby vehicles over vehicle-to-vehicle communication to thereby allow one or more nearby drivers of the nearby vehicles to perceive the hazardous state of the specific driver.

As one example, at the step of (a), the driver state detecting device instructs the drowsiness detecting network to (i) (i-1) generate at least one feature map by applying at least one convolution operation to the interior image via a convolutional layer of a face detector, (i-2) generate one or more proposal boxes, corresponding to one or more objects, on the feature map via a region proposal network of the face detector, (i-3) generate at least one feature vector by applying at least one pooling operation to one or more regions, corresponding to the proposal boxes, on the feature map via a pooling layer of the face detector, (i-4) generate at least one FC output by applying at least one fully-connected operation to the feature vector via a fully connected layer of the face detector, and (i-5) output class information and regression information on each of the objects by applying at least one classification operation and at least one regression operation to the FC output of the fully connected layer and thus detect the facial part of the specific driver on the interior image via a classification layer and a regression layer of the face detector, wherein said each of the objects corresponds to each of the proposal boxes, and (ii) convert the facial part into at least one Modified Census Transform (MCT) image via an eye detector wherein differences between a brightness of the facial part and an average of a brightness of a local part are encoded into the MCT image, detect the eye part of the specific driver from feature data for eye detection acquired from the Modified Census Transform image using Adaboost algorithm, and detect the blinking state of the eye by referring to an open/shut state of the eye in the eye part.

As one example, at the step of (a), the driver state detecting device instructs the pose matching network to (i) generate one or more feature tensors created by extracting one or more features from the interior image via a feature extractor, (ii) generate one or more keypoint heatmaps and one or more part affinity fields corresponding to each of the feature tensors via a keypoint heatmap & part affinity field extractor, and (iii) extract one or more keypoints in each of the keypoint heatmaps and group the extracted keypoints by referring to each of the part affinity fields, to thereby generate the body keypoints corresponding to the specific driver located in the interior image, via a keypoint grouping layer.

As one example, the driver state detecting device instructs the pose matching network to apply at least one convolution operation to the interior image to thereby generate the feature tensors, via at least one convolutional layer of the feature extractor.

As one example, the driver state detecting device instructs the pose matching network to apply at least one fully-convolution operation or at least one 1×1 convolution operation to the feature tensors, to thereby generate the keypoint heatmaps and the part affinity fields corresponding to said each of the feature tensors, via a fully convolutional network or at least one 1×1 convolutional layer of the keypoint heatmap & part affinity field extractor.

As one example, the driver state detecting device instructs the pose matching network to extract each of highest points on each of the keypoint heatmaps as each of the keypoints corresponding to said each of the keypoint heatmaps via the keypoint grouping layer.

As one example, the driver state detecting device instructs the pose matching network to connect pairs respectively having highest mutual connection probabilities of being connected among pairs of the extracted keypoints by referring to the part affinity fields, to thereby group the extracted keypoints, via the keypoint grouping layer.

As one example, at the step of (a), if the eye of the specific driver is shut and if duration of the eye remaining shut is equal to or greater than a preset 1-st threshold, the driver state detecting device performs a process of instructing the drowsiness detecting network to determine the specific driver as in the drowsiness state.

As one example, at the step of (a), if the body keypoints fail to match any of the driving postures and if duration of the body keypoints remaining unmatched with any of the driving postures is equal to or greater than a preset 2-nd threshold, the driver state detecting device performs a process of instructing the pose matching network to determine the driver as in the abnormal state.

In accordance with another aspect of the present disclosure, there is provided a driver state detecting device for giving a warning by detecting a drowsiness state and an abnormal state of a specific driver of a specific vehicle based on deep learning, including: at least one memory that stores instructions; and at least one processor configured to execute the instructions to perform or support another device to perform: (I) if at least one interior image of an interior of the specific vehicle is acquired, at least part of (i) a process of inputting the interior image into a drowsiness detecting network, to thereby allow the drowsiness detecting network to detect at least one facial part of the specific driver from the interior image, detect at least one eye part of the specific driver from the facial part, detect a blinking state of at least one eye of the specific driver, and thus determine the drowsiness state of the specific driver, and (ii) a process of inputting the interior image into a pose matching network, to thereby allow the pose matching network to detect one or more body keypoints, corresponding to a body of the specific driver, from the interior image, determine whether the body keypoints match one of preset driving postures, and thus determine the abnormal state of the specific driver; and (II) if the specific driver is determined as in a hazardous state by referring to at least part of the drowsiness state of the specific driver outputted from the drowsiness detecting network and the abnormal state of the specific driver outputted from the pose matching network, a process of transmitting information on the hazardous state of the specific driver to one or more nearby vehicles over vehicle-to-vehicle communication to thereby allow one or more nearby drivers of the nearby vehicles to perceive the hazardous state of the specific driver.

As one example, at the process of (I), the processor instructs the drowsiness detecting network to (i) (i-1) generate at least one feature map by applying at least one convolution operation to the interior image via a convolutional layer of a face detector, (i-2) generate one or more proposal boxes, corresponding to one or more objects, on the feature map via a region proposal network of the face detector, (i-3) generate at least one feature vector by applying at least one pooling operation to one or more regions, corresponding to the proposal boxes, on the feature map via a pooling layer of the face detector, (i-4) generate at least one FC output by applying at least one fully-connected operation to the feature vector via a fully connected layer of the face detector, and (i-5) output class information and regression information on each of the objects by applying at least one classification operation and at least one regression operation to the FC output of the fully connected layer and thus detect the facial part of the specific driver on the interior image via a classification layer and a regression layer of the face detector, wherein said each of the objects corresponds to each of the proposal boxes, and (ii) convert the facial part into at least one Modified Census Transform (MCT) image via an eye detector wherein differences between a brightness of the facial part and an average of a brightness of a local part are encoded into the MCT image, detect the eye part of the specific driver from feature data for eye detection acquired from the Modified Census Transform image using Adaboost algorithm, and detect the blinking state of the eye by referring to an open/shut state of the eye in the eye part.

As one example, at the process of (I), the processor instructs the pose matching network to (i) generate one or more feature tensors created by extracting one or more features from the interior image via a feature extractor, (ii) generate one or more keypoint heatmaps and one or more part affinity fields corresponding to each of the feature tensors via a keypoint heatmap & part affinity field extractor, and (iii) extract one or more keypoints in each of the keypoint heatmaps and group the extracted keypoints by referring to each of the part affinity fields, to thereby generate the body keypoints corresponding to the specific driver located in the interior image, via a keypoint grouping layer.

As one example, the processor instructs the pose matching network to apply at least one convolution operation to the interior image to thereby generate the feature tensors, via at least one convolutional layer of the feature extractor.

As one example, the processor instructs the pose matching network to apply at least one fully-convolution operation or at least one 1×1 convolution operation to the feature tensors, to thereby generate the keypoint heatmaps and the part affinity fields corresponding to said each of the feature tensors, via a fully convolutional network or at least one 1×1 convolutional layer of the keypoint heatmap & part affinity field extractor.

As one example, the processor instructs the pose matching network to extract each of highest points on each of the keypoint heatmaps as each of the keypoints corresponding to said each of the keypoint heatmaps via the keypoint grouping layer.

As one example, the processor instructs the pose matching network to connect pairs respectively having highest mutual connection probabilities of being connected among pairs of the extracted keypoints by referring to the part affinity fields, to thereby group the extracted keypoints, via the keypoint grouping layer.

As one example, at the process of (I), if the eye of the specific driver is shut and if duration of the eye remaining shut is equal to or greater than a preset 1-st threshold, the processor performs a process of instructing the drowsiness detecting network to determine the specific driver as in the drowsiness state.

As one example, at the process of (I), if the body keypoints fail to match any of the driving postures and if duration of the body keypoints remaining unmatched with any of the driving postures is equal to or greater than a preset 2-nd threshold, the processor performs a process of instructing the pose matching network to determine the driver as in the abnormal state.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 6 is a drawing schematically illustrating a process of detecting body keypoints of the specific driver, in the method for detecting the drowsiness state and the abnormal state of the specific driver in accordance with one example embodiment of the present disclosure.

DETAILED DESCRIPTION OF THE PREFERRED EMBODIMENTS

Figure 1:
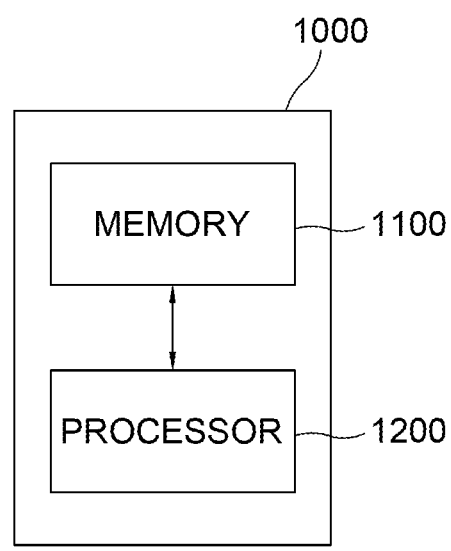
FIG. 1 is a drawing schematically illustrating a driver state detecting device for detecting at least one drowsiness state and at least one abnormal state of a specific driver of a specific vehicle and giving a warning in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating a driver state detecting device for detecting at least one drowsiness state and at least one abnormal state of a specific driver of a specific vehicle and giving a warning in accordance with one example embodiment of the present disclosure. By referring to FIG. 1, the driver state detecting device 1000 may include a memory 1100 for storing instructions to detect the drowsiness state and the abnormal state of the specific driver of the specific vehicle and give the warning and a processor 1200 for performing processes corresponding to the instructions in the memory 1100 to detect the drowsiness state and the abnormal state of the specific driver and give the warning.

Specifically, the driver state detecting device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 2:
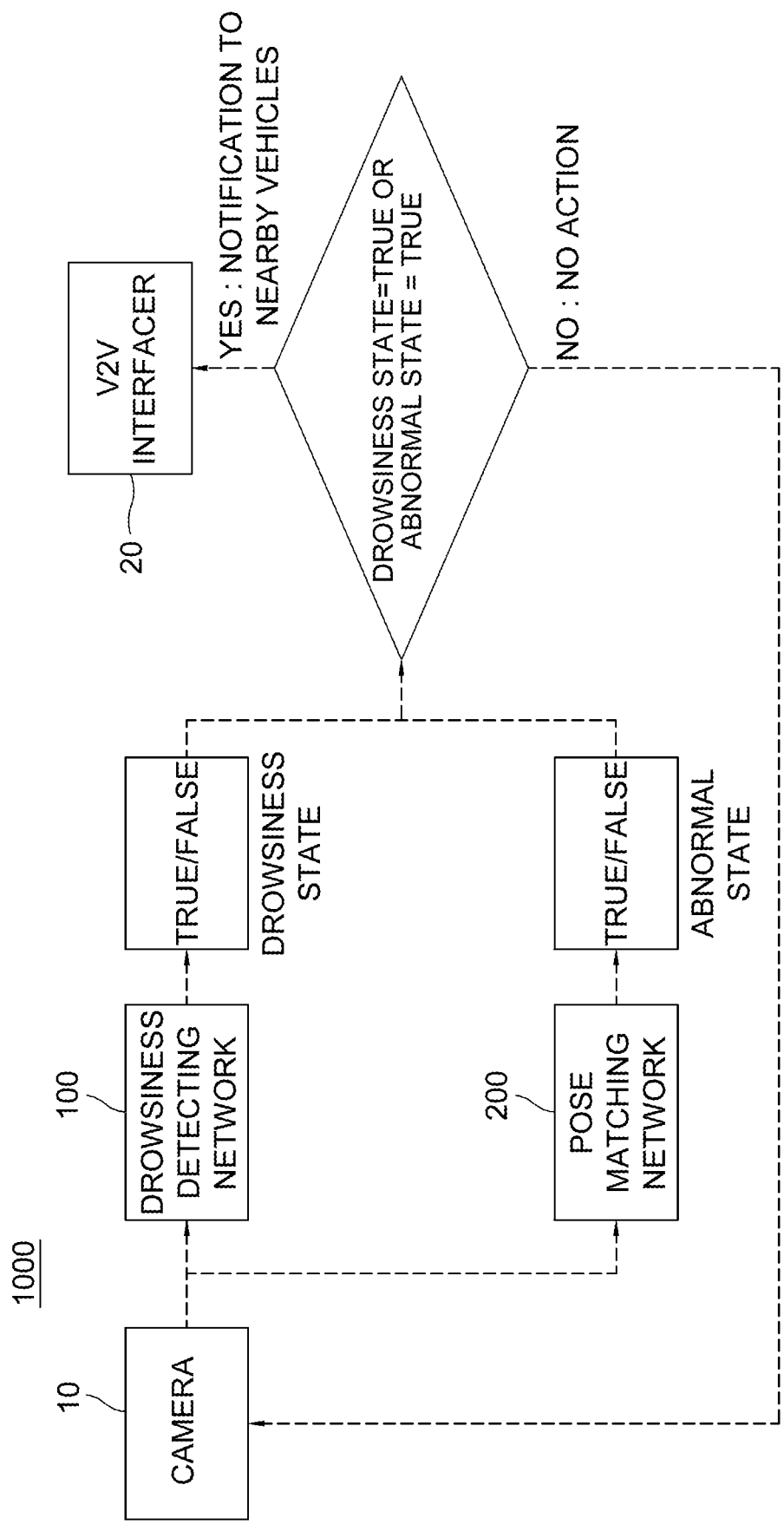
FIG. 2 is a drawing schematically illustrating a method for detecting the drowsiness state and the abnormal state of the specific driver of the specific vehicle and giving the warning in accordance with one example embodiment of the present disclosure.

A method for detecting the drowsiness state and the abnormal state of the specific driver from at least one interior image of the specific vehicle and giving the warning by using the driver state detecting device 1000 in accordance with one example embodiment of the present disclosure is described by referring to FIG. 2 as follows.

First, if the interior image of an interior of the specific vehicle taken by at least one camera 10 is acquired, the driver state detecting device 1000 may perform (i) a process of inputting the interior image into a drowsiness detecting network 100, to thereby allow the drowsiness detecting network 100 to detect at least one facial part of the specific driver from the interior image, and detect at least one eye part of the specific driver from the detected facial part, and (ii) a process of detecting a blinking state of at least one eye of the specific driver, to thereby determine the drowsiness state of the specific driver. Herein, the driver state detecting device 100 may perform (i) a process of cropping an upper half area, where a face of the specific driver is located, from the interior image, (ii) a process of inputting the cropped upper half area of the interior image into the drowsiness detecting network 100, to thereby allow the drowsiness detecting network 100 to detect the facial part of the specific driver from the cropped upper half area of the interior image, and thus to reduce computational load on the drowsiness detecting network 100, compared to detecting the facial part from the whole interior image.

Figure 3:
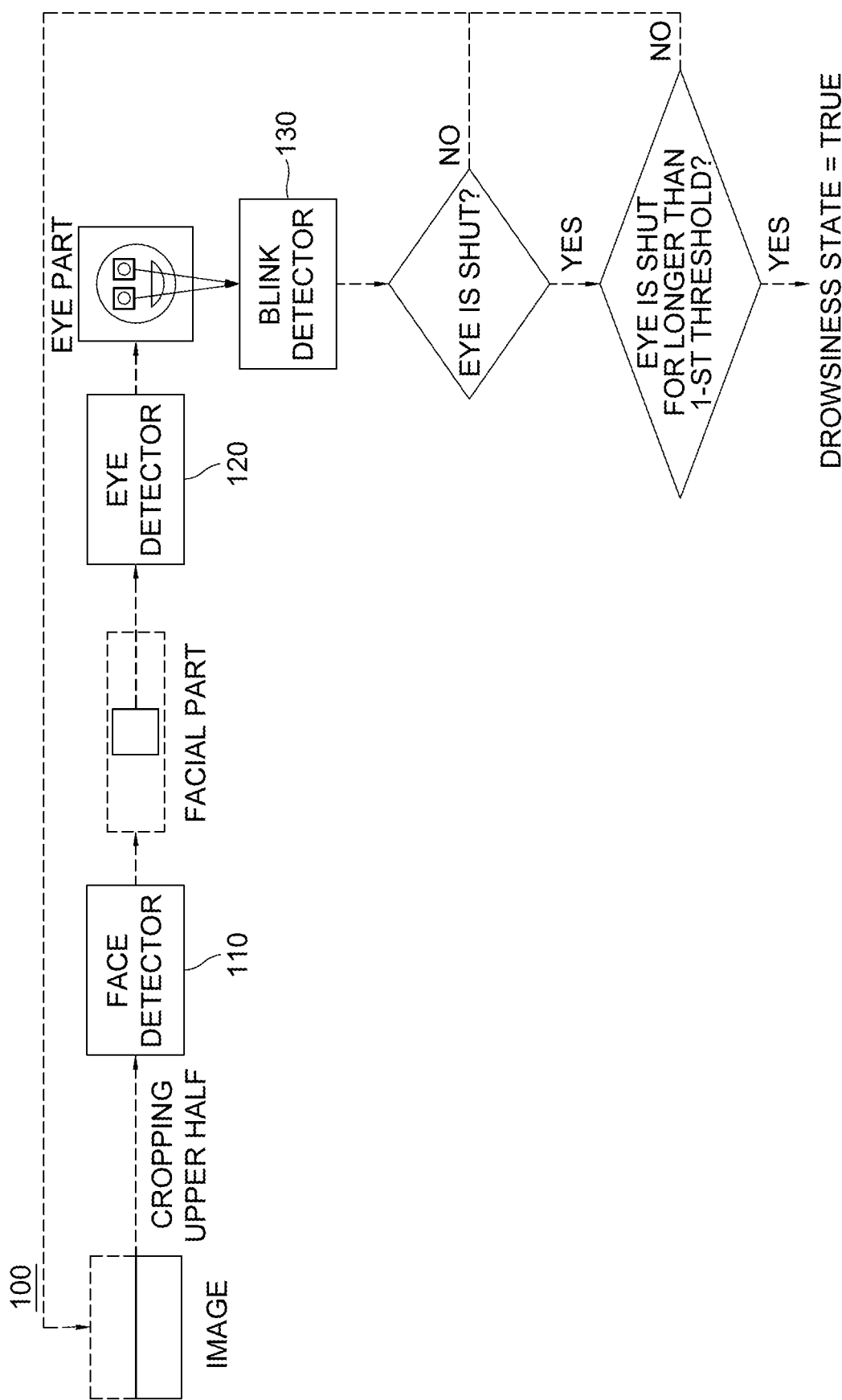
FIG. 3 is a drawing schematically illustrating a process of determining the drowsiness state of the specific driver of the specific vehicle, in the method for detecting the drowsiness state and the abnormal state of the specific driver in accordance with one example embodiment of the present disclosure.

As one example, by referring to FIG. 3, the drowsiness detecting network 100 may input the interior image into a face detector 110, to thereby allow the face detector 110 to detect the face of the specific driver on the interior image by analyzing the interior image based on deep learning.

Herein, the face detector 110 may be a detector based on a CNN (Convolutional Neural Network), but the scope of the present disclosure is not limited thereto.

Figure 4:
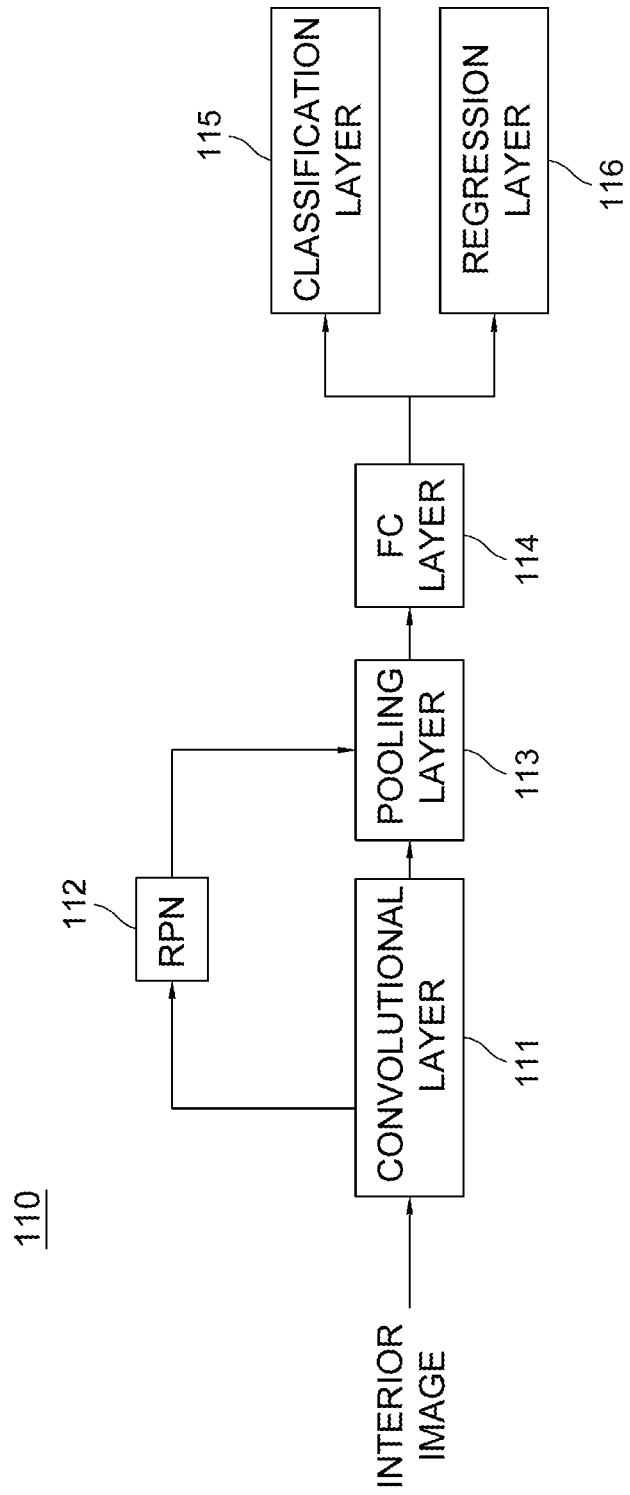
FIG. 4 is a drawing schematically illustrating a process of detecting a face of the specific driver, in the method for detecting the drowsiness state and the abnormal state of the specific driver in accordance with one example embodiment of the present disclosure.

Meanwhile, by referring to FIG. 4, the face detector 110 based on the CNN may perform a process of generating at least one feature map by applying at least one convolution operation to the interior image via at least one convolutional layer 111 and a process of generating one or more proposal boxes, corresponding to one or more objects, on the feature map via a region proposal network (RPN) 112. And, the face detector 110 may perform a process of generating at least one feature vector by applying at least one pooling operation to one or more regions, corresponding to the proposal boxes, on the feature map via a pooling layer 113, and a process of generating at least one FC output by applying at least one fully-connected operation to the feature vector via a fully connected layer 114. Thereafter, the face detector 110 may output class information and regression information on each of the objects by applying at least one classification operation and at least one regression operation to the FC output of the fully connected layer 114 and thus detect the facial part of the specific driver on the interior image via a classification layer 115 and a regression layer 116 where said each of the objects corresponds to each of the proposal boxes.

By referring to FIG. 3 again, the drowsiness detecting network 100 may input the facial part of the specific driver detected by the face detector 110 into an eye detector 120, to thereby allow the eye detector 120 to (i) convert the facial part into at least one Modified Census Transform (MCT) image where differences between a brightness of the facial part and an average of a brightness of a local part are encoded, (ii) detect the eye part of the specific driver from feature data for eye detection acquired from the MCT image using Adaboost algorithm, and (iii) detect the blinking state of the eye by referring to an open/shut state of the eye in the eye part. Herein, the blinking state may be confirmed by the open/shut state of a pupil in the eye part of the MCT image, and the open/shut state may represent whether the eye, i.e., the pupil, is open or shut. As one example, a size of the pupil when the eye of the specific driver is completely open and a size of the pupil when the eye is closed may be detected as different, and as a result, the blinking state of the eye of the specific driver may be determined.

Also, a separate blink detector 130 may be added in order to detect the blinking state of the eye of the specific driver. Herein, the blink detector 130 may detect the blinking state of the eye by tracking the pupil in the eye part.

And, if the eye of the specific driver is shut and if duration of the eye remaining shut is equal to or greater than a preset 1-st threshold, the drowsiness detecting network 100 may determine the specific driver as in the drowsiness state, by referring to the blinking state of the eye of the specific driver.

Next, by referring to FIG. 2 again, the driver state detecting device 1000 may perform a process of inputting the interior image into a pose matching network 200, to thereby allow the pose matching network 200 to detect one or more body keypoints, corresponding to a body of the specific driver, from the interior image, and determine whether the body keypoints match any of preset driving postures and thus to determine the abnormal state of the specific driver. Herein, the driving postures may be postures of drivers when the drivers normally drive vehicles sitting at driver's seats, and may be stored in a database beforehand as preset postures of the drivers in normal positions for driving the vehicles.

Figure 5:
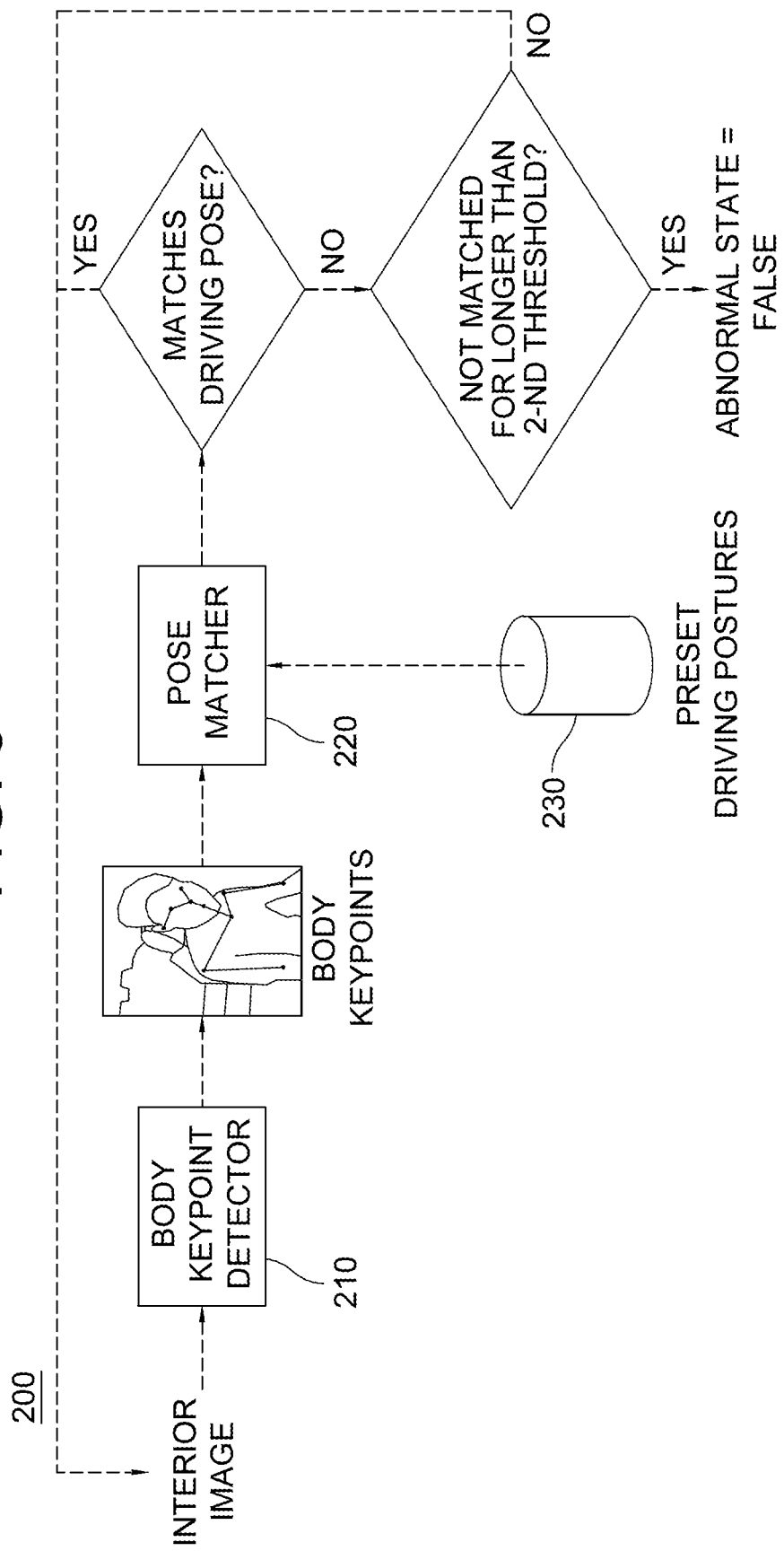
FIG. 5 is a drawing schematically illustrating a process of determining the abnormal state of the specific driver using a pose of the specific driver, in the method for detecting the drowsiness state and the abnormal state of the specific driver in accordance with one example embodiment of the present disclosure.

As one example, by referring to FIG. 5, the pose matching network 200 may input the interior image into a body keypoint detector 210, to thereby allow the body keypoint detector 210 to detect the body keypoints of the specific driver.

Herein, videos or images taken by the camera mounted in the interior of the specific vehicle have much occlusion of bodies, and in case of a driver's seat, only an upper body of the specific driver may be shown. In that case, a conventional object detector will fail to detect the specific driver with much occlusion, but the body keypoint detector 210 may determine whether the specific driver is present by using visible points only, and because the specific driver has a larger pose variation, the body keypoint detector 210 is more useful than the conventional object detector.

And, by referring to FIG. 6, a process of the body keypoint detector 210 detecting the body keypoints of the specific driver from the interior image is described in more detail.

The body keypoint detector 210 may input the interior image into a feature extraction network 211, to thereby allow the feature extraction network 211 to generate one or more feature tensors by extracting one or more features from the interior image. Herein, the feature extraction network 211 may apply at least one convolution operation to the interior image, to thereby generate the feature tensors corresponding to the interior image. And, the feature extraction network 211 may be one or more convolution blocks including one or more convolutional layers capable of performing at least one convolution operation.

And, the body keypoint detector 210 may input the feature tensors into a keypoint heatmap & part affinity field extractor 212, to thereby instruct the keypoint heatmap & part affinity field extractor 212 to generate (i) each of keypoint heatmaps corresponding to each of the feature tensors and (ii) part affinity fields which are vector maps representing relations between the keypoints. Herein, each of the part affinity fields may be a map showing connections of a specific keypoint with other keypoints, and may be a map representing each of mutual connection probabilities of each of the keypoints in each of keypoint heatmap pairs. And, a meaning of the "heatmap" may represent a combination of heat and a map, which may graphically show various information that can be expressed by colors as heat-like distribution on an image.

Herein, the keypoint heatmap & part affinity field extractor 212 may include a fully convolution network.

Also, the keypoint heatmap & part affinity field extractor 212 may include at least one 1×1 convolutional layer which applies at least one 1×1 convolution operation to the feature tensors.

Also, the keypoint heatmap & part affinity field extractor 212 may detect relations among the keypoints by using a bipartite matching, to thereby generate the part affinity fields. That is, it may be confirmed by the bipartite matching that what the relations among the keypoints are.

Thereafter, the body keypoint detector 210 may extract the keypoints from each of the keypoint heatmaps and may group the extracted keypoints by referring to each of the part affinity fields, to thereby generate the body keypoints corresponding to the specific driver located in the interior image, via a keypoint grouping layer 213.

That is, the body keypoint detector 210 may instruct the keypoint grouping layer 213 to extract the keypoints from each of the keypoint heatmaps, and connect the keypoints that have pairs with highest probabilities by referring to the extracted mutual connection probabilities. Herein, each of highest points in each of the keypoint heatmaps corresponding to each channel, that is, each of points having each of corresponding highest heat values, may be extracted as each of the keypoints corresponding to each of the keypoint heatmaps, and the keypoints, respectively having their own corresponding highest probabilities of being connected to each other among the extracted keypoints, may be paired and grouped by referring to the part affinity fields and form the body keypoints of the specific driver. As one example, a process of connecting a first keypoint among the extracted keypoints and a second keypoint among the extracted keypoints as a pair may be performed if the second keypoint is determined as having its corresponding highest probability of being connected to the first keypoint among the extracted keypoints. Herein, such a process may be performed with respect to all the extracted keypoints. Then, as a result, the extracted keypoints may be classified into one or more groups.

Next, by referring to FIG. 5 again, the pose matching network 200 may instruct a pose matcher 220 to perform pose matching between the body keypoints acquired from the body keypoint detector 210 and the preset driving postures, to thereby confirm whether the body keypoints match any of the preset driving postures.

Herein, if the body keypoints are determined as failing to match any of the preset driving postures, the pose matching network 200 may determine if duration of the body keypoints remaining unmatched with any of the driving postures is equal to or greater than a preset 2-nd threshold, to thereby determine whether the driver is in the abnormal state.

That is, if the duration of the body keypoints remaining unmatched with any of the driving postures is equal to or greater than the preset 2-nd threshold, the driver may be determined as in the abnormal state. For example, the abnormal state may correspond to one of situations where the specific driver does not pay attention to driving but bows down to pick up things, where the specific driver is unconscious, etc.

Next, by referring to FIG. 2 again, if the specific driver is determined as in a hazardous state by referring to at least part of the drowsiness state of the specific driver outputted from the drowsiness detecting network 100 and the abnormal state of the specific driver outputted from the pose matching network 200, the driver state detecting device 1000 may perform a process of transmitting information on the hazardous state of the specific driver to one or more nearby vehicles via a vehicle-to-vehicle interfacer 20, to thereby allow one or more nearby drivers of the nearby vehicles to perceive the hazardous state of the specific driver, and as a result, risk of traffic accidents is reduced by allowing the nearby drivers to pay attention to the specific vehicle driven by the specific driver in the hazardous state.

Meanwhile, if the specific driver is determined as in the hazardous state, the driver state detecting device 1000 may alert the specific driver in the hazardous state, to thereby allow the specific driver to be aware of such a fact. As one example, if the specific driver is determined as in the hazardous state, the driver state detecting device 1000 may sound an alarm or vibrate the driver's seat or a steering wheel, to thereby allow the specific driver to be aware of the fact.

As described above, the present disclosure detects the hazardous state by monitoring a driver status using the humans' status recognition, and secures inter-vehicle driving safety by performing V2V hazard warning over V2V connection.

The present disclosure has an effect of efficiently detecting the drowsiness state and the abnormal state of the specific driver by evaluating the blinking state and a driving posture of the specific driver respectively.

The present disclosure has another effect of warning the nearby drivers of the hazardous state of the specific driver, by transmitting the information on the hazardous state of the specific driver to the nearby vehicles by the V2V communication.

The present disclosure has still another effect of preventing the traffic accidents that may occur due to the hazardous state of the specific driver, by transmitting the information on the hazardous state of the specific driver to the nearby vehicles by the V2V communication.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for giving a warning by detecting a drowsiness state and an abnormal state of a specific driver of a specific vehicle based on deep learning, comprising steps of:
    (a) if at least one interior image of an interior of the specific vehicle is acquired, a driver state detecting device performing at least part of (i) a process of inputting the interior image into a drowsiness detecting network, to thereby allow the drowsiness detecting network to detect at least one facial part of the specific driver from the interior image, detect at least one eye part of the specific driver from the facial part, detect a blinking state of at least one eye of the specific driver, and thus determine the drowsiness state of the specific driver, and (ii) a process of inputting the interior image into a pose matching network, to thereby allow the pose matching network to detect one or more body keypoints, corresponding to a body of the specific driver, from the interior image, determine whether the body keypoints match one of preset driving postures, and thus determine the abnormal state of the specific driver; and
    (b) if the specific driver is determined as in a hazardous state by referring to at least part of the drowsiness state of the specific driver outputted from the drowsiness detecting network and the abnormal state of the specific driver outputted from the pose matching network, the driver state detecting device performing a process of transmitting information on the hazardous state of the specific driver to one or more nearby vehicles over vehicle-to-vehicle communication to thereby allow one or more nearby drivers of the nearby vehicles to perceive the hazardous state of the specific driver.

2. The method of claim 1, wherein, at the step of (a), the driver state detecting device instructs the drowsiness detecting network to (i) (i-1) generate at least one feature map by applying at least one convolution operation to the interior image via a convolutional layer of a face detector, (i-2) generate one or more proposal boxes, corresponding to one or more objects, on the feature map via a region proposal network of the face detector, (i-3) generate at least one feature vector by applying at least one pooling operation to one or more regions, corresponding to the proposal boxes, on the feature map via a pooling layer of the face detector, (i-4) generate at least one FC output by applying at least one fully-connected operation to the feature vector via a fully connected layer of the face detector, and (i-5) output class information and regression information on each of the objects by applying at least one classification operation and at least one regression operation to the FC output of the fully connected layer and thus detect the facial part of the specific driver on the interior image via a classification layer and a regression layer of the face detector, wherein said each of the objects corresponds to each of the proposal boxes, and (ii) convert the facial part into at least one Modified Census Transform (MCT) image via an eye detector wherein differences between a brightness of the facial part and an average of a brightness of a local part are encoded into the MCT image, detect the eye part of the specific driver from feature data for eye detection acquired from the Modified Census Transform image using Adaboost algorithm, and detect the blinking state of the eye by referring to an open/shut state of the eye in the eye part.

3. The method of claim 1, wherein, at the step of (a), the driver state detecting device instructs the pose matching network to (i) generate one or more feature tensors created by extracting one or more features from the interior image via a feature extractor, (ii) generate one or more keypoint heatmaps and one or more part affinity fields corresponding to each of the feature tensors via a keypoint heatmap & part affinity field extractor, and (iii) extract one or more keypoints in each of the keypoint heatmaps and group the extracted keypoints by referring to each of the part affinity fields, to thereby generate the body keypoints corresponding to the specific driver located in the interior image, via a keypoint grouping layer.

4. The method of claim 3, wherein the driver state detecting device instructs the pose matching network to apply at least one convolution operation to the interior image to thereby generate the feature tensors, via at least one convolutional layer of the feature extractor.

5. The method of claim 3, wherein the driver state detecting device instructs the pose matching network to apply at least one fully-convolution operation or at least one 1×1 convolution operation to the feature tensors, to thereby generate the keypoint heatmaps and the part affinity fields corresponding to said each of the feature tensors, via a fully convolutional network or at least one 1×1 convolutional layer of the keypoint heatmap & part affinity field extractor.

6. The method of claim 3, wherein the driver state detecting device instructs the pose matching network to extract each of highest points on each of the keypoint heatmaps as each of the keypoints corresponding to said each of the keypoint heatmaps via the keypoint grouping layer.

7. The method of claim 6, wherein the driver state detecting device instructs the pose matching network to connect pairs respectively having highest mutual connection probabilities of being connected among pairs of the extracted keypoints by referring to the part affinity fields, to thereby group the extracted keypoints, via the keypoint grouping layer.

8. The method of claim 1, wherein, at the step of (a), if the eye of the specific driver is shut and if duration of the eye remaining shut is equal to or greater than a preset 1-st threshold, the driver state detecting device performs a process of instructing the drowsiness detecting network to determine the specific driver as in the drowsiness state.

9. The method of claim 1, wherein, at the step of (a), if the body keypoints fail to match any of the driving postures and if duration of the body keypoints remaining unmatched with any of the driving postures is equal to or greater than a preset 2-nd threshold, the driver state detecting device performs a process of instructing the pose matching network to determine the driver as in the abnormal state.

10. A driver state detecting device for giving a warning by detecting a drowsiness state and an abnormal state of a specific driver of a specific vehicle based on deep learning, comprising:
at least one memory that stores instructions; and
at least one processor configured to execute the instructions to perform or support another device to perform: (I) if at least one interior image of an interior of the specific vehicle is acquired, at least part of (i) a process of inputting the interior image into a drowsiness detecting network, to thereby allow the drowsiness detecting network to detect at least one facial part of the specific driver from the interior image, detect at least one eye part of the specific driver from the facial part, detect a blinking state of at least one eye of the specific driver, and thus determine the drowsiness state of the specific driver, and (ii) a process of inputting the interior image into a pose matching network, to thereby allow the pose matching network to detect one or more body keypoints, corresponding to a body of the specific driver, from the interior image, determine whether the body keypoints match one of preset driving postures, and thus determine the abnormal state of the specific driver; and (II) if the specific driver is determined as in a hazardous state by referring to at least part of the drowsiness state of the specific driver outputted from the drowsiness detecting network and the abnormal state of the specific driver outputted from the pose matching network, a process of transmitting information on the hazardous state of the specific driver to one or more nearby vehicles over vehicle-to-vehicle communication to thereby allow one or more nearby drivers of the nearby vehicles to perceive the hazardous state of the specific driver.

11. The driver state detecting device of claim 10, wherein, at the process of (I), the processor instructs the drowsiness detecting network to (i) (i-1) generate at least one feature map by applying at least one convolution operation to the interior image via a convolutional layer of a face detector, (i-2) generate one or more proposal boxes, corresponding to one or more objects, on the feature map via a region proposal network of the face detector, (i-3) generate at least one feature vector by applying at least one pooling operation to one or more regions, corresponding to the proposal boxes, on the feature map via a pooling layer of the face detector, (i-4) generate at least one FC output by applying at least one fully-connected operation to the feature vector via a fully connected layer of the face detector, and (i-5) output class information and regression information on each of the objects by applying at least one classification operation and at least one regression operation to the FC output of the fully connected layer and thus detect the facial part of the specific driver on the interior image via a classification layer and a regression layer of the face detector, wherein said each of the objects corresponds to each of the proposal boxes, and (ii) convert the facial part into at least one Modified Census Transform (MCT) image via an eye detector wherein differences between a brightness of the facial part and an average of a brightness of a local part are encoded into the MCT image, detect the eye part of the specific driver from feature data for eye detection acquired from the Modified Census Transform image using Adaboost algorithm, and detect the blinking state of the eye by referring to an open/shut state of the eye in the eye part.

12. The driver state detecting device of claim 10, wherein, at the process of (I), the processor instructs the pose matching network to (i) generate one or more feature tensors created by extracting one or more features from the interior image via a feature extractor, (ii) generate one or more keypoint heatmaps and one or more part affinity fields corresponding to each of the feature tensors via a keypoint heatmap & part affinity field extractor, and (iii) extract one or more keypoints in each of the keypoint heatmaps and group the extracted keypoints by referring to each of the part affinity fields, to thereby generate the body keypoints corresponding to the specific driver located in the interior image, via a keypoint grouping layer.

13. The driver state detecting device of claim 12, wherein the processor instructs the pose matching network to apply at least one convolution operation to the interior image to thereby generate the feature tensors, via at least one convolutional layer of the feature extractor.

14. The driver state detecting device of claim 12, wherein the processor instructs the pose matching network to apply at least one fully-convolution operation or at least one 1×1 convolution operation to the feature tensors, to thereby generate the keypoint heatmaps and the part affinity fields corresponding to said each of the feature tensors, via a fully convolutional network or at least one 1×1 convolutional layer of the keypoint heatmap & part affinity field extractor.

15. The driver state detecting device of claim 12, wherein the processor instructs the pose matching network to extract each of highest points on each of the keypoint heatmaps as each of the keypoints corresponding to said each of the keypoint heatmaps via the keypoint grouping layer.

16. The method of claim 15, wherein the processor instructs the pose matching network to connect pairs respectively having highest mutual connection probabilities of being connected among pairs of the extracted keypoints by referring to the part affinity fields, to thereby group the extracted keypoints, via the keypoint grouping layer.

17. The driver state detecting device of claim 10, wherein, at the process of (I), if the eye of the specific driver is shut and if duration of the eye remaining shut is equal to or greater than a preset 1-st threshold, the processor performs a process of instructing the drowsiness detecting network to determine the specific driver as in the drowsiness state.

18. The driver state detecting device of claim 10, wherein, at the process of (I), if the body keypoints fail to match any of the driving postures and if duration of the body keypoints remaining unmatched with any of the driving postures is equal to or greater than a preset 2-nd threshold, the processor performs a process of instructing the pose matching network to determine the driver as in the abnormal state.

\* \* \* \* \*